June 28, 1949.　　　M. S. LIPMAN ET AL　　　2,474,431
CLAMP
Filed May 3, 1946
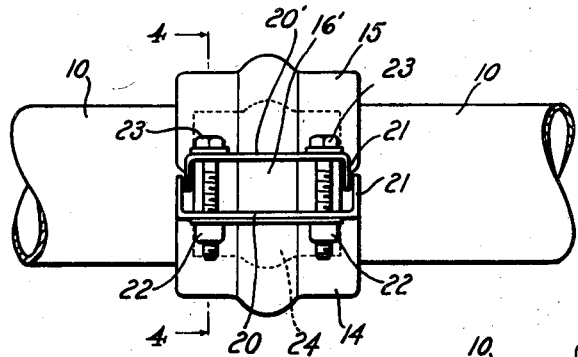
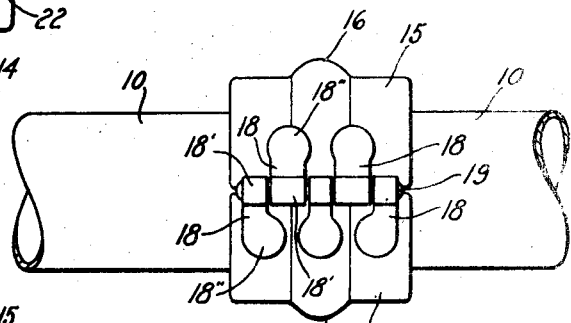
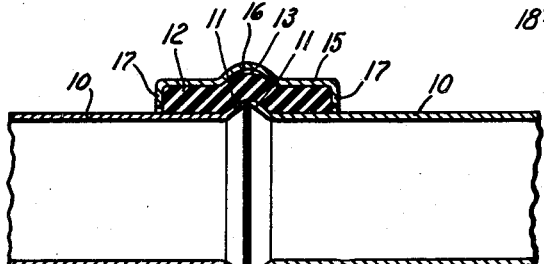
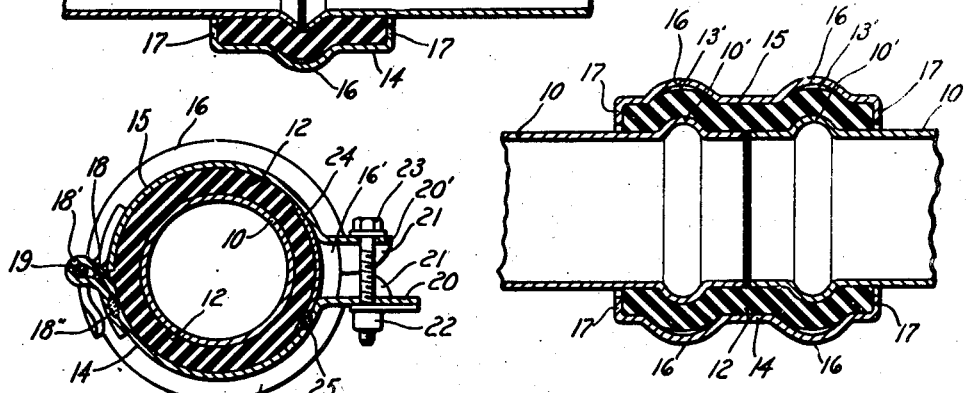
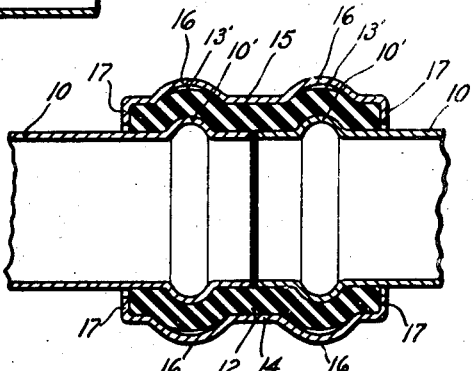
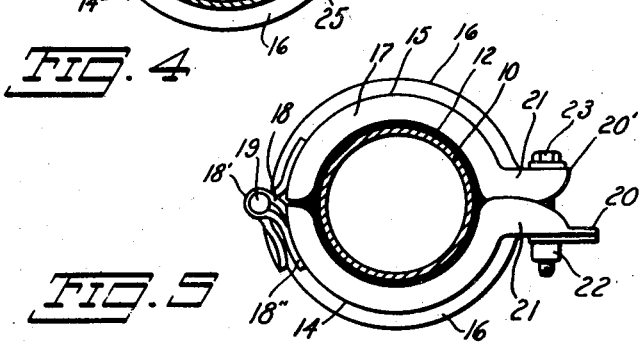
INVENTORS.
Maurice S. Lipman
Wilmot W. Godon
BY Charles J. Wilson,
ATTORNEY.

Patented June 28, 1949

2,474,431

UNITED STATES PATENT OFFICE 2,474,431

CLAMP

Maurice S. Lipman, Hempstead, and Wilmot W. Godon, Freeport, N. Y., assignors to Republic Aviation Corporation, near Farmingdale, N. Y., a corporation of Delaware Application May 3, 1946, Serial No. 666,965

2 Claims. (Cl. 285—129)

1

This invention relates to clamps and proposes a device which will sealingly connect the adjacent ends of tubes or pipes in such manner that, regardless of the pressure within the tubes or pipes, no leakage will occur at the joint or connection between the pipes or tubes. Though the instant clamp is primarily designed as a sealing connection between aligned pipes it can be readily modified to constitute a seal for leaks which may occur in the body of a single pipe or tube especially where high internal pressures are present.

While the present clamp may be of general application and use, it is primarily intended for use in connecting the pipe or tube sections of high-pressure systems in aircraft such, for example, as the hydraulic or fire extinguishing systems.

Among its objects the present invention contemplates a clamp suitable to connect sections of tubing that is relatively simple and compact and accomplishes a reduction in the number of parts heretofore employed in such connections between the abutting or adjoining ends of tube sections to thereby attain an appreciable reduction in weight in comparison with the connections previously employed for that purpose.

Furthermore the instant clamp has in view the placing, removal and replacement of clamping connections without materially disturbing the tubes or the assembly of tube sections and also proposes a reduction in the size of the apertures or openings in structural parts through which the tube or pipe assembly is required to pass.

With the above and other objects in view, as will be apparent, this invention consists in the construction, combination and arrangement of parts all as hereinafter more fully described, claimed and illustrated in the accompanying drawings, wherein:

Fig. 1 is a side elevation of a clamp constructed in accordance with the present invention showing it applied to the ends of abutting tube sections;

Fig. 2 is also a side elevation of the clamp viewed from the opposite side thereof to that shown in Fig. 1;

Fig. 3 is a section taken longitudinally through the clamp and tube sections connected thereby to illustrate the cooperation between the complemental clamping members, the elastic sleeve and the extremities of the tubes or tube sections;

Fig. 4 is a transverse section taken along line 4—4 of Fig. 1;

Fig. 5 is a side elevation of the clamp in its operative position; and

2

Fig. 6 is a view similar to Fig. 3 and illustrates a modification in the shape of the engaged end portions of the tubes and the cooperation thereof with the clamp and connector.

Heretofore tube sections have been connected at or near their abutting ends in an assembly by all manner of clamps or connections, which have been open to numerous objections, particularly when employed in the assembly of hydraulic fire-extinguishing or similar systems in aircraft where a series of tubes or pipes are sometimes assembled and connected one to another prior to the installation of the system. Thus, if the connection between the abutting ends of the tube sections is large and cumbersome or has an outside diameter greater than that of the tubes, the apertures or openings in the structural elements of the aircraft through which the tubes or assembly thereof are to pass must be enlarged considerably beyond the size required to accommodate the tubes or tube assembly so that the connections or clamps between adjoining or abutting or assembled tube sections may pass through such apertures or openings. This increases in the size of the apertures or openings necessarily weakens the structural elements of the aircraft. The present clamp or connection by being applicable after the installation of the tube or pipe sections which combine to create a system overcomes any necessity to provide oversize openings in the structural elements to permit the passage therethrough of the clamps or connections.

Another objection to the prior clamps and connections can be attributed to the construction thereof and the coaction between the elements thereof. One form of such prior devices comprises a ring and a nut seated on the end portion of the tube after which the extremity of the tube is flared. Each abutting tube section has these two elements mounted thereon to be held in place by the deformation of the extremity of the tube, the nut being positioned by the ring and rotatable with respect to the tube. Between the two nuts mounted on abutting tube sections is a nipple which is threaded into engagement at its ends with the adjacent nuts carried by the tube sections as aforesaid. This connecting assembly requires a total of five pieces and in each instant the nut must be mounted on the tube prior to the installation of the tube or the assembly thereof into a system. Manifestly this type of prior connection is relatively heavy and the openings in the structural elements of an aircraft must be of a size sufficient to accommodate not only the tube itself but also must be oversize to accommodate the nuts. Furthermore, in an assembly using this or almost any other prior type of clamp or connecting means the joint per se is rigid and cannot react to vibration or any minor shifts in position of the system.

The present invention proposes to reduce the number of parts required in devices of this character to thereby reduce the gross weight of the system wherein they are used. Also it contemplates a clamp made of sheet metal rather than machined castings. Likewise, it does not require any coaction or cooperation between the clamp or connector and the tubes to be connected thereby until the tubes of the system have been situated within the aircraft after which they may be connected without the use of wrenches and the attendant provision of the space necessary for the operation of the wrenches. In addition to these advantages the present invention produces a semi-flexible joint between the abutting tube sections which will react to and permit a degree of vibration and relative movement between the tube sections without breakage or leaks.

As will be hereafter described a slight modification of the present clamp or connection will permit of its use as a seal to close leaks which may occur in the components of the system independently of the joints or connections between the tube sections thereof.

Reference being had particularly to the drawings, 10 designates a tube section, two of which are aligned or abutted, or approximately abutted, at their adjoining ends as illustrated. The end portions of each tube section 10 is flared outwardly to create an angularly outstanding flange 11 by which the tube sections are engaged and secured one to the other by the present clamp or connector.

A cylindrical sleeve 12 of natural or synthetic rubber or other equivalent material, forms an operative part of the present clamp or connector and receives at its opposite ends the corresponding ends of the tubes 10. When the sleeve 12 is mounted on and receives the adjacent ends of the aligned tubes 10 the sloping or angularly disposed flanges 11 at the ends of the tubes becomes embedded in the inner wall of the sleeve as shown in Fig. 3 thereby deforming the sleeve and producing a bead or protrusion 13 in the outer face of the sleeve. Manifestly the sleeve 12 connects the tubes 10 one to the other and by its nature and inherent characteristics seals the joint between the extremities of the tubes 10.

To hold the sleeve 12 fixedly in place on the adjacent extremities of the tubes 10 and to so confine it and direct its elasticity that the joint between the tubes is completely and effectively sealed, a pair of complemental clamping members 14 and 15 operate over and clampingly engage the sleeve 12. Each of these clamping members comprises an arcuate plate curved concentrically with the curvature of the outer face of the sleeve 12 and provided with an internal depression 16, which is reflected externally of the member, for the reception of the central bead 13 formed in the sleeve 12 by the flanges 11. An inwardly extending flange 17 is formed at each edge of the clamping members 14 and 15, having width less than the thickness of the sleeve 12. Thus each of the complemental clamping members 14—15 comprises a channel defined by the arcuate plate 14 or 15 and the comparatively short flanges 17 at the edges of said plate. It will be observed from Figs. 3 and 6 that the width of the plate 14 or 15 and consequently the space of the flanges 17 is substantially equal to the length of the sleeve 12 after it has been affixed to and received the adjoining end portions of the tubes 10 and the width of the flanges 17 is such that when the clamp is in its operative position the edges of said flanges do not contact or engage the outer surfaces of the tubes 10.

The clamping members 14 and 15 are hinged one to the other at corresponding or mating ends. Manifestly, any type of hinge may be employed for that purpose but a preferred form consists of a series of spaced ears 18 formed integrally with each plate or clamping member, the ears 18 on the plate 14 corresponding to and aligning with the spaces between the ears 18 on the plate 15 and vice versa. Each ear 18 of each plate is bent outwardly upon itself to create a loop 18' and position its end portions adjacent its root and against the outer face of its integral plate where it is spot-welded or otherwise secured, as at 18'', to the plate. This produces a series of aligned engaging sockets or loops 18' on each plate through which a pivot pin 19 may be projected when the loops 18' of one plate overlap and are aligned with the similar loops 18' of the complemental plate. In this manner adjoining ends of the clamping members 14 and 15 are hingedly secured one to the other at one end of the clamp or connector leaving the opposite ends of said plates free for relative movement about the pin 19 as a pivot.

The opposite ends of the clamping members 14 and 15 respectively terminate in outwardly projecting flanges 20 and 20' which when the clamping member is in its operative position rest substantially horizontal and parallel. Continuations 21 of the flanges 17 are provided at the edges or extremities of the flanges 20 and as the flanges 17 approach each other for the engagement and compression of the sleeve 12 these continuation flanges 21 overlap as illustrated in Figs. 1 and 5. The flange 20 carried by the lower clamping member 14 has a greater length than that carried by the companion or complemental clamping member 15 whereby space is provided for the mounting of nuts as will be described and means of manipulating the clamping members 14 and 15 about the hinge pin 19 is created. The outer face of the flange 20 formed integrally with the clamping member 14 has a plurality of nuts 22 secured to its outer face while the flange 20' of the complemental clamping member 15 is provided with apertures normally in alignment with said nuts. Bolts or screws 23 passing through apertures aforesaid may be threaded into the nuts 22 and thereby secure the free or unhinged ends of the clamping members 14 and 15 adjustably one to the other. The pressure of the clamping members 14 and 15 upon the sleeve 12 can be regulated by the adjustment of the screws or bolts 23.

A curved sealing or closure plate 24 is secured by welding or otherwise as at 25 along one of its edges to the clamping member 14 carrying the longer flange 20 and adjacent to the root of said flange. The body of this sealing or closure plate 24 is curved to concentric to and in agreement with the curvature of the plates or clamping members 14—15. When the clamping members are secured one to the other by the bolts 23 in engagement with and over the sleeve 12, the sealing plate 24 overlaps the inner surface of the companion or complemental sealing member 15 and completely closes the space between the extremities of said clamping members 14 and 15, as represented by the spacing of the flanges 20 and 20' respectively carried thereby. This plate 24 has a cross-sectional formation agreeing with the cross-sectional shape of the clamping plates 14 and 15 and therefore has an internal depression creating an external bead 16' which aligns with and forms a continuation of the beads 16 of said clamping members. By this means the resilient sleeve 12 is completely housed in and between the clamping members 14 and 15 except such portions thereof as are exposed between the edges of the flanges 17 and the tubes 10.

In Fig. 6 is shown the modified form of the present invention which operates and functions as does that form shown in Figs. 1 and 5. Here each of the tubes 10 is provided with a bead 10', adjacent its extremity and the beads thus formed are received and embedded in the inner face of the sleeve 12. The outer face of the sleeve therefore develops two substantially parallel outstanding beads 13' and therefore two parallel recesses 16 are formed in the plates 14 and 15 for the reception of these beads 10'. Otherwise the operation and construction of the clamp in Fig. 6 is identical with that shown in the other figures of the drawing.

From the foregoing it is manifest that the abutting ends of the tubes 10 are resiliently and effectively sealed one to the other by the clamp structures herein disclosed and that the clamp between the end portions of the tubes 10 permits some relative movement therebetween, thus accommodating and reacting any vibration of the supporting structure and relative movement of the tubes. It is also apparent that the seal surrounding the adjoining ends of the tube sections 10 is completely housed and so intimately associated with the tubes that leakage at the joint between tube sections is practically impossible. The clamp and connector may be assembled with the tube sections 10 after the tube sections are positioned or placed and that any apertures through which the tube sections pass in being positioned or placed must only have a diameter equal to and slightly greater than the greatest diameter of the flare 11 or bead 10'. The tubes may be passed through the structural apertures provided for the reception thereof and subsequently abutted and secured one to the other by the clamp. Since no threaded cooperation between elements of the clamp is required, it is unnecessary to provide space within the structure for the manipulation of wrenches and similar tools. The clamping members 14 and 15 are merely positioned over the sleeve 12 after which the threaded bolts 23 may be adjusted by a screw-driver or by a relatively small wrench.

This clamp being designed primarily for aircraft makes it possible to clampingly and sealingly connect the tube sections 10 by a structure which is inherently simple and appreciably less in weight than any known clamp heretofore adaptable to aeronautical use. However, while the clamp and connection is designed for use on aircraft it can easily and readily be adapted to any structure employing a tube assembly and is particularly efficient in sealing the joint between the sections of tubing of any type of high-pressure system.

It is also possible to employ the present clamp as a seal for a leak occurring in a single tube or tube section 10. In that event the sleeve 12 may be longitudinally split so that it may embrace the tube at the point of the leak after which it may be clamped and held in this position by the plates 14 and 15.

What is claimed is:

1. The combination with a relatively thick sleeve of elastic material for the reception of the adjacent end portions of tube sections, each tube section having a projecting portion to be embedded in the inner surface of said sleeve, of a pair of arcuate clamping members hingedly connected one to the other at corresponding ends and having inwardly extending flanges at their edges, the flanges of each clamping member being spaced a distance at least equal to the length of the sleeve and having a width less than the thickness of the sleeve, said flanges being situated over the ends of the sleeve as to restrict the latter longitudinally when the clamping members operatively engage the sleeve, means carried by each clamping member for the reception and housing of the deformation of the sleeve caused by the projections on the tubes under pressure of said clamping members, and means for adjustably securing the unhinged ends of said clamping members one to the other.

2. The combination with a relatively thick cylindrical sleeve formed of elastic material, having uniform internal and external diameters throughout its length and adapted to receive the adjoining end portions of aligned tube sections, of a pair of clamping members hinged one to the other at corresponding ends thereof and adapted to closely embrace and clampingly engage and compress the said sleeve, each of said members embodying means to positively restrict longitudinal distortion of the sleeve and also having means to simultaneously provide for radial distortion thereof, all upon the compression of the sleeve by said members, and means for adjustably securing the unhinged ends of said members one to the other.

MAURICE S. LIPMAN.
WILMOT W. GODON.

REFERENCES CITED

The following references are of record in the file of this patent:

UNITED STATES PATENTS

| Number | Name | Date |
| --- | --- | --- |
| 920,169 | Neuberth | May 4, 1909 |
| 1,026,211 | Kissinges | May 14, 1912 |
| 1,928,316 | Muto | Sept. 26, 1933 |

FOREIGN PATENTS

| Number | Country | Date |
| --- | --- | --- |
| 16,323 | Great Britain | Dec. 1884 |